(12) United States Patent
Murphy et al.

(10) Patent No.: US 6,298,307 B1
(45) Date of Patent: *Oct. 2, 2001

(54) USER SPECIFIC REAL-TIME WEATHER INFORMATION SOURCE FOR COMPILING TIME VARYING WEATHER CONDITIONS RELATING TO FUTURE EVENT

(75) Inventors: John M. Murphy, Westminster; Wayne Crosby Moore, Longmont; Robert Keith Barron, Boulder, all of CO (US)

(73) Assignees: University Corporation for Atmospheric Research; WITI Corporation, both of Boulder, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,296

(22) Filed: Oct. 29, 1997

(51) Int. Cl.[7] .................................................. G06F 17/30
(52) U.S. Cl. .................................. 702/3; 702/2; 707/10; 707/104
(58) Field of Search ................................. 707/1–6, 8–10, 707/100–104, 200–203; 395/200.49; 379/74, 84, 87, 101.1, 93.09; 704/275, 9; 342/26, 352, 192, 84; 706/20, 902, 930–931; 705/10, 14, 15; 702/2–4, 5

(56) References Cited

U.S. PATENT DOCUMENTS

| | | | |
|---|---|---|---|
| 4,450,477 | 5/1984 | Lovett | 348/7 |
| 4,521,857 | 6/1985 | Reynolds, III | 379/88.17 |
| 5,132,992 | 7/1992 | Yurt et al. | 375/240 |
| 5,253,275 | 10/1993 | Yurt et al. | 375/240 |
| 5,265,024 | 11/1993 | Crabill et al. | 701/200 |
| 5,390,237 | * 2/1995 | Hoffman, Jr. et al. | 379/88.23 |
| 5,410,343 | 4/1995 | Coddington et al. | 348/7 |
| 5,475,587 | 12/1995 | Anick et al. | 704/9 |
| 5,517,193 | * 5/1996 | Allison et al. | 342/26 |
| 5,654,886 | * 8/1997 | Zereski, Jr. et al. | 702/3 |
| 5,717,589 | * 2/1998 | Thompson et al. | 702/3 |
| 5,740,549 | * 4/1998 | Reilly et al. | 705/14 |
| 5,793,813 | * 8/1998 | Cleave | 375/259 |
| 5,796,932 | * 8/1998 | Fox et al. | 395/161 |
| 5,796,945 | * 8/1998 | Tarabella | 395/200.49 |
| 5,909,671 | * 6/1999 | Byford et al. | 705/26 |
| 5,940,776 | * 8/1999 | Baron et al. | 702/4 |
| 6,018,699 | * 1/2000 | Baron, Sr. et al. | 702/3 |

* cited by examiner

Primary Examiner—Jack Choules
Assistant Examiner—Srirama Channavajjala

(57) ABSTRACT

The best-in-time forecasting system customizes its output forecast to the specific needs of a user and an identified event, which forecast is optimized as a function of the length of time between the receipt of the request and the time of the event. The best-in-time forecasting system comprises a data ingest & assimilation system that obtains the time-varying phenomena characteristic data from a plurality of external data sources and processes this information into a form and content appropriate for the needs of the best-in-time forecasting system. The processed data is stored in an information server for use by a presentation content system which functions to receive, process and respond to the user-provided information requests. A plurality of databases are included in the presentation content system to provide a subset of the time-varying characteristic data that the phenomena forecaster requires to process the forecast request. A user preferences database is an optional component of this database and functions to record the past activity of the user to enable the best-in-time forecasting system to provide user-customized responses. An activity database provides information relating to a definition of the various activities which are supported by the best-in-time forecasting system. The activity data notes the time-varying characteristics that are relevant to this activity so that the presentation content system can customize the data stored in the time-varying phenomena characteristic information database as a function of the event.

16 Claims, 5 Drawing Sheets

USER SPECIFIC REAL-TIME WEATHER INFORMATION SOURCE FOR COMPILING TIME VARYING WEATHER CONDITIONS RELATING TO FUTURE EVENT

FIELD OF THE INVENTION

This invention relates to forecasting systems, and in particular to a best-in-time forecasting system for on demand forecasting the time-varying characteristics of a phenomena as they relate to a user-identified future event that is to take place at an identified locus. The present best-in-time forecasting system customizes the forecast provided to the user as a function of the users information preferences, the type of activity specified by the user, and the length of time between the receipt of the request and the time of the event.

Problem

It is a problem in the field of forecasting to assimilate the plethora of information that relates to the time-varying characteristics of monitored phenomena and provide users, on demand, with an accurate forecast of specific characteristics of the phenomena that can be expected to be present at a defined locus and future time identified by the user. A further problem is that existing forecasting systems cannot customize the forecast provided to the user as a function of the user's information preferences, the type of event specified by the user, and the length of time between the receipt of the request and the time of the event.

A typical forecasting application is the provision of weather forecasts to members of the general public. The users who request weather forecast information have varying interests, different levels of understanding of the received forecasts, and different modes of communicating with the forecasting system. Similarly, the activity of interest to the user has unique characteristics that effect the type of weather information that must be provided to the user. Finally, the user should be provided with the most accurate information that is presently available for forecasting the desired weather characteristics, which data may be available from a multitude of sources, each having different degrees of accuracy as a function of the length of time between the receipt of the request and the time of the event. Existing weather forecasting systems are unable to provide forecasts that are customized to reflect these above-noted factors. The existing weather forecasting systems simply provide an output that is immutable in format and type of content, regardless of the needs of the user. Each weather forecasting system is designed to provide a certain level of information, and is typically designed for a predefined audience, who have certain weather information needs.

Thus, there presently does not exist a forecasting system, especially a weather forecasting system, that can customize its output forecast to the specific needs of a user and an identified event, which forecast is optimized based upon the length of time between the receipt of the request and the time of the event.

Solution

The present best-in-time forecasting system overcomes the problems of the prior art and provides a forecasting system that can customize its output forecast to the specific needs of a user and an identified event, which forecast is optimized as a function of the length of time between the receipt of the request and the time of the event. The best-in-time forecasting system comprises a data ingest & assimilation system that obtains the time-varying phenomena characteristic data from a plurality of external data sources and processes this information into a form and content appropriate for the needs of the best-in-time forecasting system. The processed data is stored in an information server for use by a presentation content system which functions to receive, process and respond to the user-provided information requests. A plurality of databases are included in the best-in-time forecasting system, one of which provides a subset of the time-varying characteristic data that the phenomena forecaster requires to process the forecast request. This database contains the previously processed results relating to the user-desired time-varying phenomena characteristic information. A user preferences database is an optional component of this database and functions to record the past activity of the user to enable the best-in-time forecasting system to provide user-customized responses. An activity database provides information relating to a definition of the various activities which are supported by the best-in-time forecasting system. The activity data notes the time-varying characteristics that are relevant to this activity so that the presentation content system can customize the data stored in the time-varying phenomena characteristic information database as a function of the event.

The present best-in-time forecasting system is illustrated as a weather forecasting system that provides a user with weather information that is customized to the specific needs of a user and an identified event, which forecast is also optimized as a function of the length of time between the receipt of the request and the time of the event. In operation, a user provides the best-in-time forecasting system with data indicative of the time, date, place for the forecast as well as the type of activity that the user wishes to participate in on the identified time and date. Regardless of the information provided by the user, the best-in-time forecasting system generates a response, with the thoroughness and accuracy of the response being a function of the specificity of the user-provided information and the length of time between the present time and the event occurrence. The user's request stimulates the best-in-time forecasting system to identify the set of resources that are available to the best-in-time forecasting system that can be used to provide the user-requested information. In the present weather forecasting system example, the information can be purely climate data or a blending of real-time and weather forecast data sources. The forecast can also be tailored to the specific activity identified by the user. The user-provided data can include threshold data which causes the best-in-time forecasting system to generate a notification of the user if certain parameters are met or exceeded. The best-in-time forecasting system can then notify the user via a communication medium through which the user is connected to the best-in-time forecasting system to provide a forecast having a content and format that are customized for the user-specific request. The request may originate via user's calendar and scheduling software, project management software, an events scheduler or by completing a best-in-time forecasting system provided screen.

DETAILED DESCRIPTION

Figure 1:
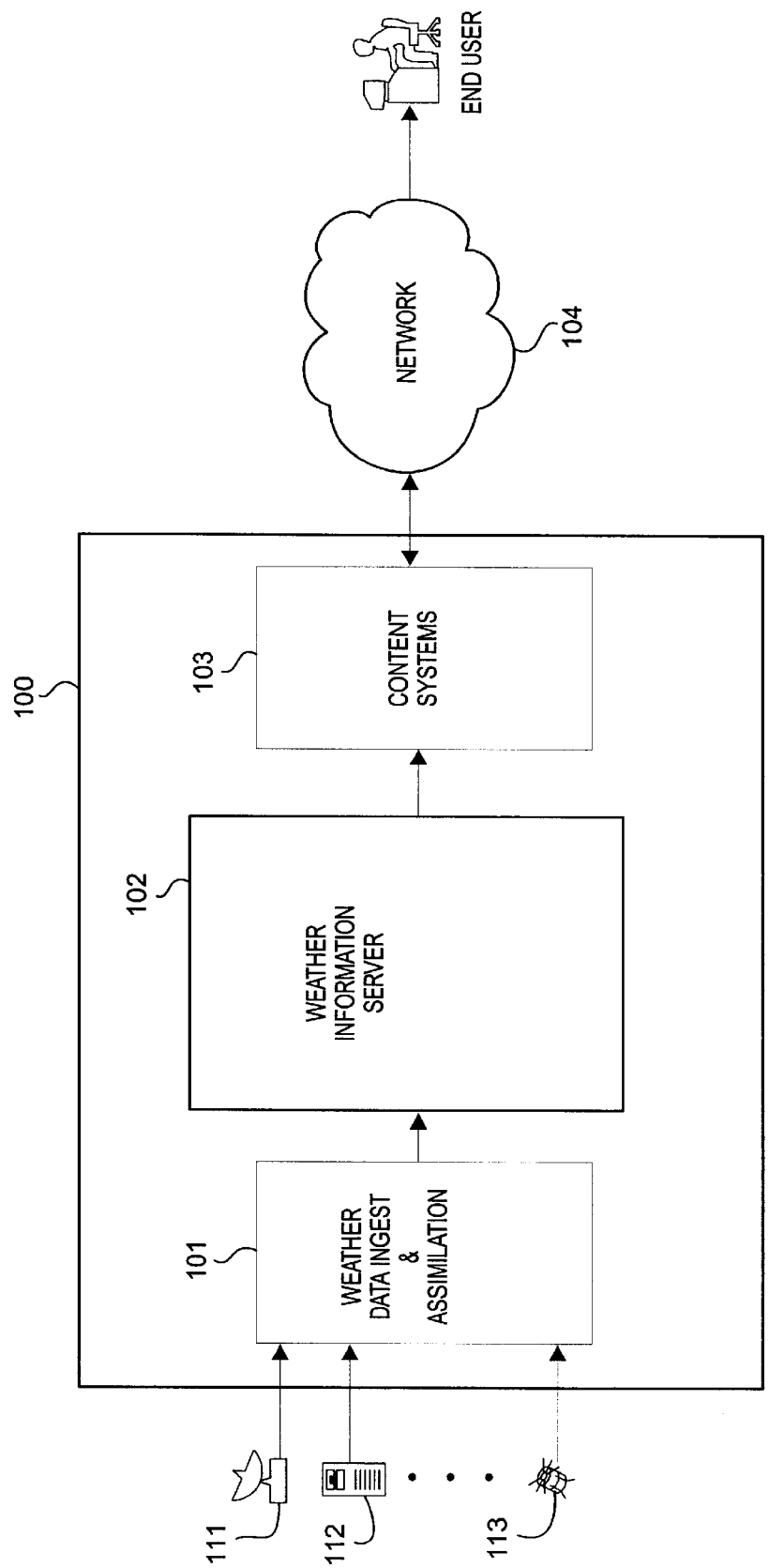
FIG. 1 illustrates in block diagram form the overall architecture of the present best-in-time forecasting system.

FIG. 1 illustrates in block diagram form the overall architecture of the resent best-in-time forecasting system 100. The best-in-time forecasting system 100 provides on demand forecasting of the time-varying characteristics of a phenomena as they relate to a user-identified future event that is to take place at an identified locus. The present best-in-time forecasting system 100 customizes the forecast provided to the user as a function of the user's information preferences, the type of activity specified by the user, and the length of time between the receipt of the request and the time of the event.

The particular example of the best-in-time forecasting system illustrated herein is a meteorological information processing system that provides weather forecast data to requesting users. The best-in-time forecasting system 100 comprises a plurality of operational segments, one of which (weather data ingest & assimilation system 101) functions to provide the data ingest and assimilation functions to obtain the time-varying phenomena characteristic data from a plurality of external Data Sources 111–113. The best-in-time forecasting system 100 is connected to at least one and preferably a plurality of Data Sources 111–113 from which the best-in-time forecasting system 100 obtains the information which it processes to respond to user-provided information requests. The best-in-time forecasting system 100 also includes a Weather Information Server 102 that functions to store the processed time-varying phenomena characteristic data in memory in a manner that enables the best-in-time forecasting system 100 to provide responses to the requesting users. The best-in-time forecasting system 100 also includes a Presentation Content System 103 which functions to receive, process and respond to the user-provided forecast requests. A plurality of databases (shown in FIG. 4) are included in the Presentation Content System 103 of best-in-time forecasting system 100, one of which (time-varying phenomena characteristic information database 411) provides a subset of the time-varying characteristic data that the Presentation Content System 103 requires to process the forecast request. This database contains the basic raw data and previously processed results relating to the user-desired time-varying phenomena characteristic information. A User Preferences Database 412 is an optional component and functions to record the past activity of the user to enable the best-in-time forecasting system 100 to provide user-customized responses. An Activity Database 413 provides information relating to a definition of the various activities which are supported by the best-in-time forecasting system 100. The activity data notes the time-varying characteristics that are relevant to this activity so that the Presentation Content System 103 can customize the data stored in the time-varying phenomena characteristic information database as a function of the event. Finally, an Alarm Process 414 is provided to monitor various user-defined and/or predefined thresholds to generate alerts to the users, as requested or as related to their forecast queries.

The best-in-time forecasting system 100 is also typically connected to a communication medium, such as a Network 104 which serves to interconnect the best-in-time forecasting system 100 with a plurality, of users. The Network 104 functions as a switched point-to-point communication system to enable a user to input a request for forecast information to the best-in-time forecasting system 100 and receive forecast information therefrom.

The best-in-time forecasting system 100 therefore interconnects with a plurality of Data Sources 111–113 which typically comprise a diversity of meteorological data processing systems in order that the data collected by these systems can be used in an integrated manner to provide data to users who have specific data retrieval needs which, in many cases, are inconsistent with the form, format and content of the data produced by the various meteorological data processing systems. A plurality of meteorological data processing systems are illustrated as connected to the best-in-time forecasting system 100, although one or more of these meteorological data processing systems can be incorporated into the best-in-time forecasting system 100 without departing from the conceptual architecture that is disclosed herein. The various meteorological data processing systems comprise systems that collect data from various sensors, which data is indicative of a present value or a forecasted value of a predetermined meteorological characteristic or phenomena. The data so collected is then processed in well known manner by the processing element contained within the meteorological data processing system to convert the collected raw data into a human understandable display of the characteristics of the meteorological phenomena that are of interest to the user. The output display information is transmitted from each of the meteorological data processing systems to the best-in-time time forecasting system 100 as well as, in certain cases, the unprocessed or partially processed data obtained from the sensors which serve this particular meteorological data processing system. The present best-in-time forecasting system weather database therefore typically contains basic raw data, weather products and previously processed results relating to weather information.

Weather Data Ingest & Assimilation System

Figure 2:
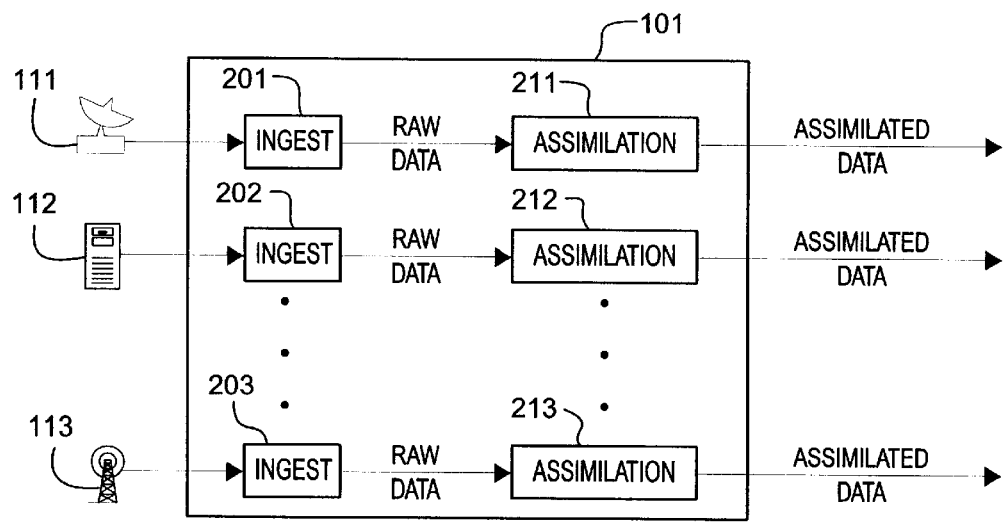
FIG. 2 illustrates in block diagram form additional details of the Weather Data Ingest & Assimilation system of the present best-in-time forecasting system.

The Weather Data Ingest & Assimilation System 101, shown in additional detail in FIG. 2, is responsible for the ingest of raw data from numerous data sensors and Data Sources 111–113, including the National Weather Service radar and satellites. Each of the raw data streams generated by these Data Sources 111–113 may require assimilation in both space and time, and must be formatted in a manner to be properly interpreted by the Data Interface 301 element (shown in FIG. 3) of the Weather Information Server 102. Therefore, the Weather Data Ingest & Assimilation System 101 includes Ingest Elements 201–203, each of which functions as the physical interface to receive the data output by an associated one of Data Sources 111–113. This received raw data is forwarded by the Ingest Elements 201–203 to associated Assimilation Elements 211–213 which convert the raw data into a form and content that is usable by the Weather Information Server 102.

Data Sources

The plurality of Data Sources 111–113 that are connected to the Weather Data Ingest & Assimilation System 101 can include data received from the National Weather Service and data from private vendors. The data from the National Weather Service family of services can include: METAR Surface Data, and NGM MOS Data. The data received from each of these sources have characteristics and content that are specific to the particular data source. Therefore, the received data from a plurality of Data Sources 111–113 must typically used to satisfy a user presented information request. The following examples indicate two typical data streams obtained from presently available Data Sources.

An example of NGM MOS data is:

```
FOUS14 KWBC 280000
ABE EC NGM MOS GUIDANCE 8/26/97 0000 UTC
DAY/AUG26    /AUG27    /AUG28
HOUR 06 09 12 15 18 21 00 03 06 09 12 15 18 21 00 03 06 09 12
MX/MN         80     62    80    64
TEMP 64 62 63 72 78 78 73 68 65 63 65 73 77 77 73 69 67 65 66
DEWPT 60 60 60 61 60 60 61 61 62 62 63 64 63 62 63 64 64 63 63
CLDS BK BK OV BK BK BK BK BK BK OV OV BK BK BK BK BK BK BK
SC
WDIR 05 04 06 12 18 17 18 20 21 08 15 20 20 20 20 20 20 26 23
WSPD 04 04 02 03 04 05 04 05 05 04 04 06 09 08 07 05 05 04 05
POP06     19    6    21    4    7    10    16    25    19
POP12        27    11    23    33
QPF     01   0/   0/0   0/   0/0   0/   0/0   0/  0/0
TSV06 23 /0 11/0 14/2 29/0 15/1 10/1 32/13 39/5 20/1
TSV12    28/0    35/2    23/2    52/16
CIG  5  5  5  5  6  6  7  7  7  6  6  6  6
VIS  5  4  4  5  5  5  5  5  5  5  3  5  5
OBVIS  N  N  F  N  N  N  N  N  N  F  F  N  N
```

This data provides meteorological measurement data on a predetermined interval basis. The above example illustrates typical data for the dates of August 26–28 (line 3) on a three hour interval basis (line 4). The measurement data of interest for the present example includes maximum and minimum temperatures (line 6), as well as temperature (line 7), dewpoint (line 8), cloud characteristics (line 9), wind direction (line 10) and speed (line 11) for each of the noted time intervals.

An example of METAR data is:
SAUS80 KWBC 270000
METAR
KCZZ 262348Z AUTO 27008KT 33/12 A2993 RMK AO2 SLP 102 6/ T03330117 10350 20328 56007 PWINO TSNO=KJDN 262348Z AUTO 08011KT 33/12 A2990 RMK AO2 SLP113 T03280117 20306 56017 PWINO TSNO=KP38 282348Z AUTO 16008G16KT 130V200 34/03 A3000 RMK AO2 SLP106 T03390028 10344 20317 56015 PWINO TSNO=KCDR 262346Z 19014KT 30SM FEW100 BKN120 BKN150 BKN250 33/14 A2997
RMK T03270143 12 HR HIGH 37.5 CELSIUS 24 HR LOW 15.6 CELSIUS=KART 262348Z 24005KT 7SM BKN150 OVC200 20/16 A3005 RMK SLP176 20195 54000=

It is obvious that this data is far more cryptic and in a form and content that does not correspond to the above-noted NGM MOS data. The Weather Data Ingest & Assimilation System 101 therefore must extract the relevant information from the various received data streams for use in the generation of the requested forecast and outputs assimilated data to the Weather information Server 102.

Weather Information Server

Figure 3:
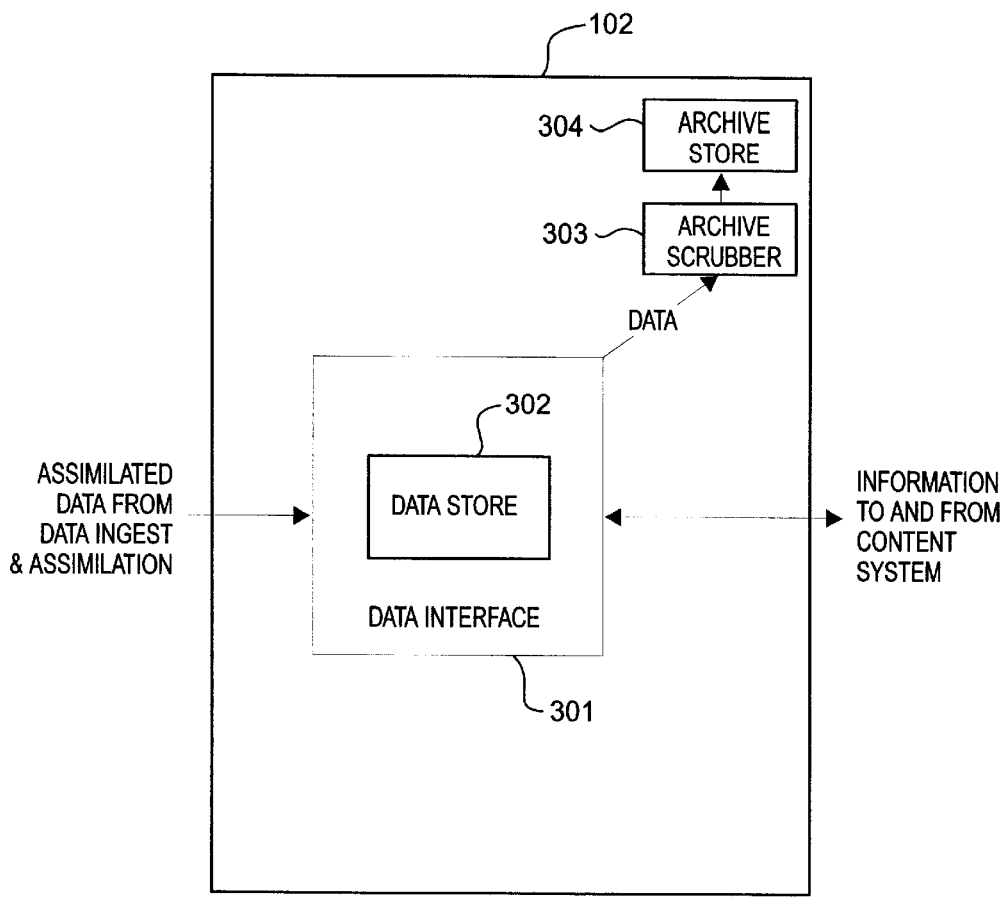
FIG. 3 illustrates in block diagram form additional details of the Weather Information Server system of the present best-in-time forecasting system.

The Weather Information Server 102, illustrated in additional detail in FIG. 3, contains all of the data that has been ingested and assimilated by the best-in-time forecasting system 100. The Weather Information Server 102 accepts the assimilated data received from the Weather Data Ingest & Assimilation System 101 and provides a set of tools and systems to facilitate the integration, generation and dissemination of the desired weather products and data. The received data is stored in a multidimensional database (Data Store 302) that contains all of the weather information presently available for the sites that are maintained in the best-in-time forecasting system 100. This data is formatted, inventoried and addressed by the Data Interface 301 portion of the Weather Information Server 102. In addition, an Archive Scrubber 303 functions to migrate old data from the Data Store 302 to the Archive Store 304, when this data has expired or is no longer valid. The Archive Store 304 represents a history of the input data to enable the best-in-time forecasting system 100 to retrieve historic data in the forecasting process.

Presentation Content System

Figure 4:
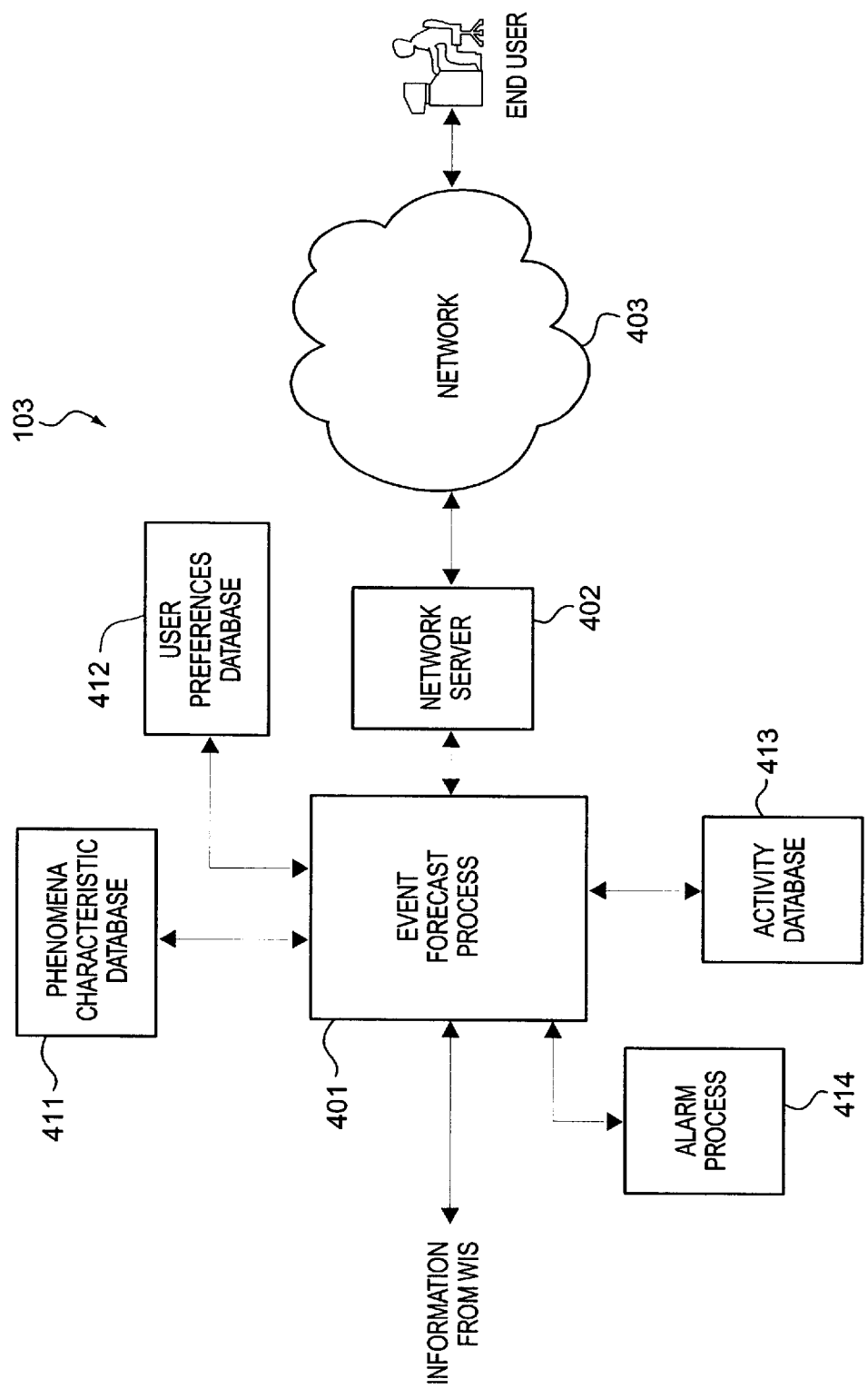
FIG. 4 illustrates in block diagram form additional details of the phenomena forecaster of the present best-in-time forecasting system.

The Presentation Content System 103, illustrated in additional detail in FIG. 4, functions to create the user information by accessing and integrating the data stored in the Weather Information Server 102, other information providers, and non-weather databases. The Presentation Content System 103 comprises a plurality of databases, with the Time-Varying Phenomena Characteristic Information Database 411 providing a subset of the time-varying characteristic data that the phenomena forecaster requires to process the forecast request. This Time-Varying Phenomena Characteristic Information Database 411 contains the previously processed results relating to the user-desired time-varying phenomena characteristic information. User Preferences Database 412 is an optional component of this Presentation Content System 103 and functions to record the past activity of the user to enable the best-in-time forecasting system to provide user-customized responses. An Activity Database 413 provides information relating to a definition of the various activities which are supported by the best-in-time time forecasting system 100. The activity data notes the time-varying characteristics that are relevant to this activity so that the Presentation Content System 103 can customize the data stored in the Time-Varying Phenomena Characteristic Information Database 411 as a function of the event. The integration of the various data stored in these databases is effected by the Event Forecast Process 401, which operates on the forecast request received from a user by retrieving the information from these databases most appropriate to generate a forecast to satisfy the user's request. An example of the operation of the Event Forecast Process 401 is provided below.

Typical Forecast Information Request

The present best-in-time forecasting system 100 uses CGI calls to transfer data to an interface program that runs on a Network Server 402. CGI is a well-known method for providing additional functionality to WEB servers, such as Network Server 402. The format for a user request that initiates an CGI call is also well defined. The basic CGI functionality is presently described on the Internet at the URL "http://hoohoo.ncsa.uiuc.edu/cgi/interface.html" as follows:

What is CGI?

CGI is not a language. It's a simple protocol that can be used to communicate between WEB forms and your program. A CGI script can be written in any language that can read STDIN, write to STDOUT, and read environment variables, i.e. virtually any programming language, including C, Perl, or even shell scripting.

Structure of a CGI Script

Here's the typical sequence of steps for a CGI script:

1. Read the users form input.
2. Do what you want with the data.
3. Write the HTML response to STDOUT.

Reading the User's Form Input

When the user submits the form, your script receives the form data as a set of name-value pairs. The names are what you defined in the INPUT tags (or SELECT or TEXTAREA tags), and the values are whatever the user typed in or selected. (Users can also submit files with forms, but this primer doesn't cover that.)

This set of name-value pairs is given to you as one long string, which you need to parse. It's not very complicated, and there are plenty of existing routines to do it for you. Here's one in Perl, a simpler one in Perl, or one in C. The CGI directory at Yahoo includes many CGI routines (and pre-written scripts), in various languages.

If that's good enough for you, skip to the next section. If you'd rather do it yourself, or if you're just curious, here's the format of the long string:

"name1=value1&name2=value2&name3=value3"

So just split on the ampersands and equal signs. Then do two more things to each name and value:

1. Convert all "+" characters to spaces, and
2. Convert all "%xx" sequences to the single character whose ascii value is "xx", in hex. For example, convert "%3d" to "=".

This is needed because the original long string in URL-encoded, to allow for equal signs, ampersands, and so forth in the user's input.

So where do you get the long string? That depends on the HTTP method the form was submitted with:

For GET submissions, its in the environment variable QUERY_STRING.

For POST submissions, read it from STDIN. The exact number of bytes to read is in the environment variable CONTENT_LENGTH.

Sending the Response Back to the User

First, write the line: Content-Type: text/html plus another blank line, to STDOUT. After that, write your HTML response page to STDOUT, and it will be sent to the user when your script is done. That's all there is to it.

Figure 5A:
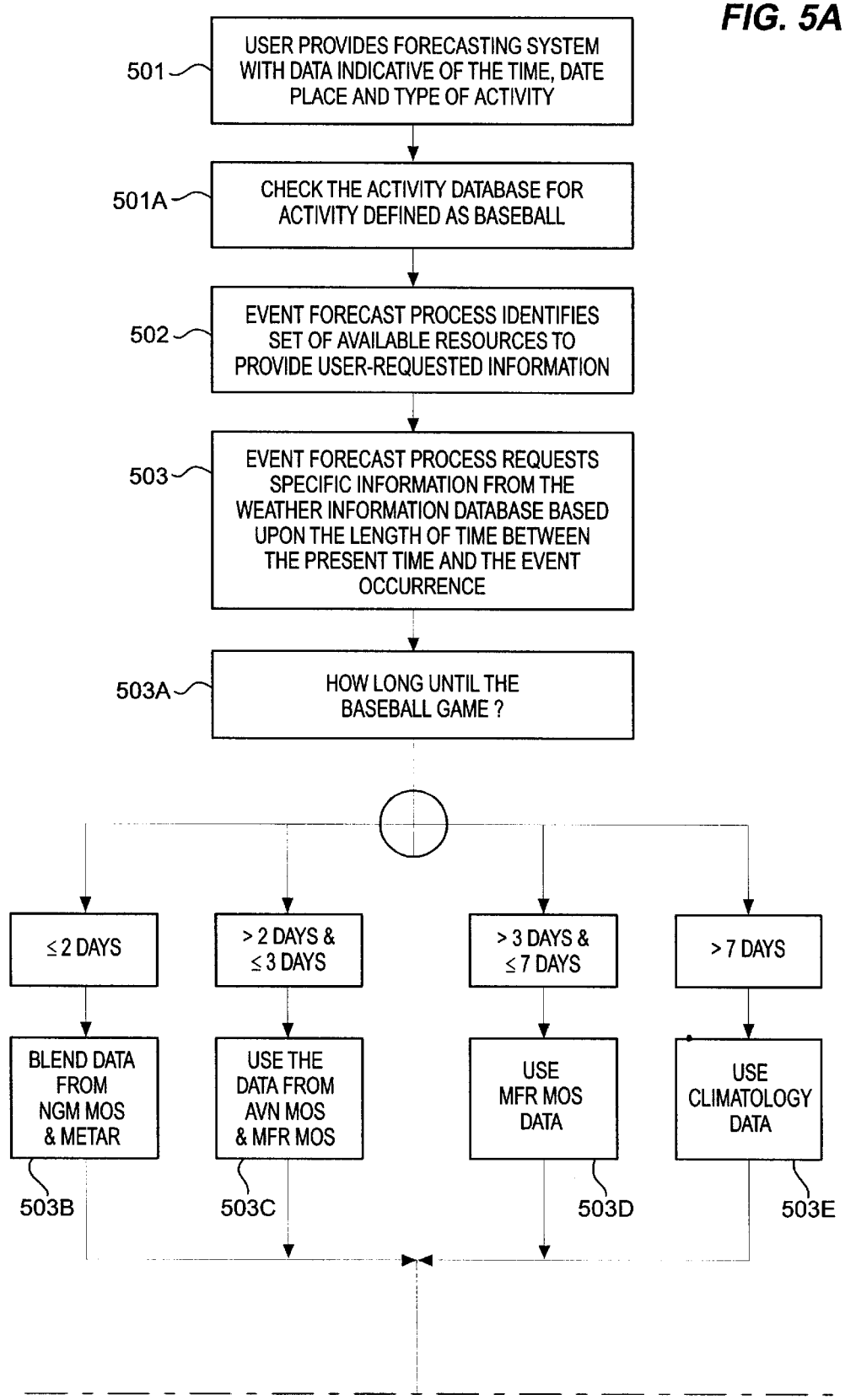
FIGS. 5A and 5B illustrate in flow diagram form the operation of the present best-in-time forecasting system in customizing the forecast for an identified user and this user's specific forecast request.
Figure 5B:
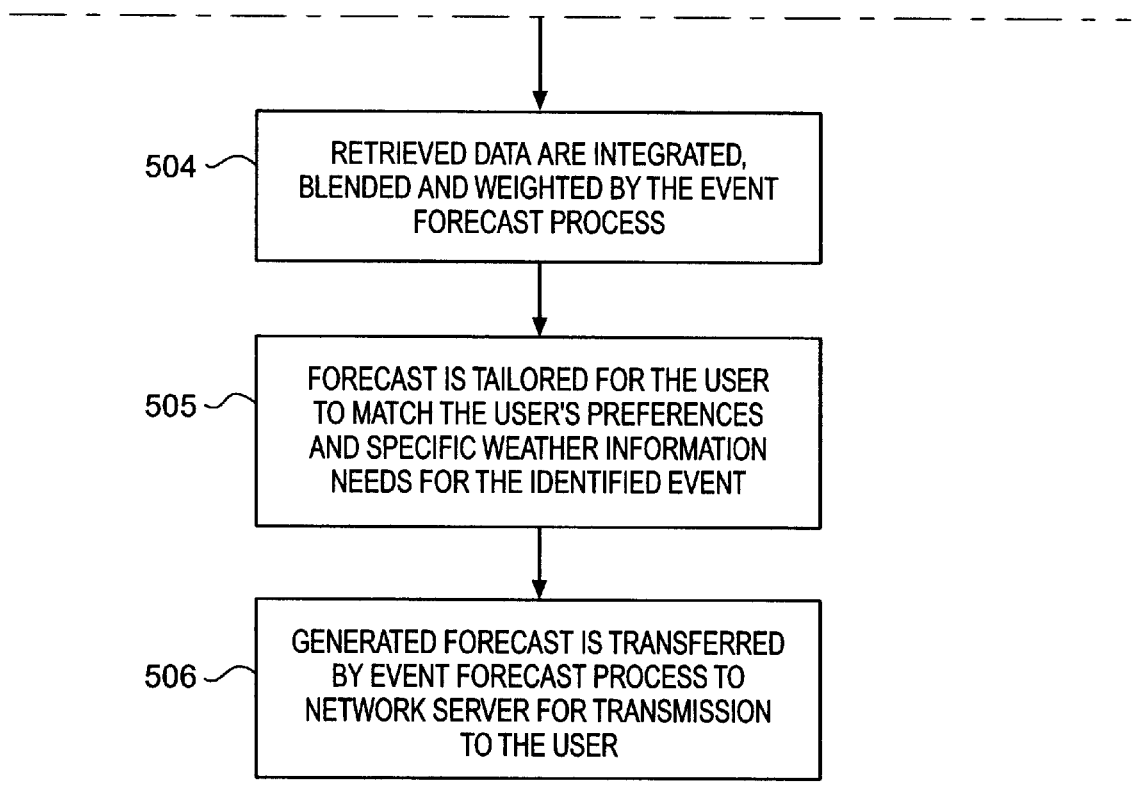

FIGS. 5A and 5B illustrate in flow diagram form the processing of a user provided forecast request by the present best-in-time forecasting system 100. A user provides the best-in-time forecasting system 100 with data indicative of the time, date, place and type of activity at step 501. Regardless of the information provided by the user, the best-in-time forecasting system 100 generates a response with the thoroughness and accuracy of the response being a function of the specificity of the user-provided information and the length of time between the present time and the event occurrence. In particular, the user's request stimulates the best-in-time forecasting system 100 at step 501A to check the Activity Database 413 to determine the particular characteristics that are relevant to the selected activity. The Event Forecast Process 401 at step 502 identifies the set of resources that are available to the best-in-time forecasting system 100 that can be used to provide the user-requested information. The information can be purely climate data or a blending of real-time and forecast data sources. The forecast can also be tailored to the specific activity identified by the user. The user-provided data can include threshold data which causes the best-in-time forecasting system 100 to generate a notification of the user if certain parameters are met or exceeded. The best-in-time forecasting system 100 can then notify the user through some communication medium, such as by Network Server 402 transmitting an E-Mail message to the user over network 403. The request may alternatively originate via user's calendar and scheduling software, project management software, an events scheduler or by completing a system provided screen.

A user requests a forecast for a particular date, time and place. Based upon the length of time between the present time and the event occurrence, at step 503 the Event Forecast Process 401 requests specific information from the Weather Information Database 102. The retrieved data are integrated, blended and weighted by the Event Forecast Process 401 at step 504 to produce the best possible forecast from the presently available information. The forecast is tailored for the user to match the user's preferences and specific weather information needs for the identified event at step 505. Finally, the generated forecast is transferred by Event Forecast Process 401 to Network Server 402 for transmission to the user at step 506 over Network 403.

Example: A user is planning a trip to a selected city at a point in time distant from the present time. The user's event scheduling system is set to alert the user if precipitation is predicted for the event. The users event scheduling system can periodically query the best-in-time forecasting system 100 to provide the user with the desired information. As the event date and time approaches the presently time, the specificity and accuracy of the forecast increases.

In this query process example, the user, identified by the user code ID71466, requests the forecast for the desired event, comprising a baseball game being played at 10 AM tomorrow in Boston, Mass. at Fenway Park. This request is made over the Internet to Network Server 402. In the present example, this request comprises the data: baseball game, Boston, 10 AM tomorrow. This request is sent by the user from their data input terminal over the network 403 to the web server (Network Server 402). The user request can be coded in the following exemplary form:

/event?userID=71466&rq_type=baseball&station= BOS&date=08%2F07%2F97& dtime=10&name= Toronto+at+Boston In the best-in-time forecasting system 100, the selection of data sources is done based upon the following factors:

1. The geographic location for which a forecast is desired.
2. The length of time between the time of the request and the time for which a forecast is desired.
3. The type of activity for which the forecast is intended.

The decisions made by the Event Forecast Process 401 of the best-in-time forecasting system 100 to select the appropriate data sources to produce a forecast for a baseball game are shown in FIG. 5 as:

How long until the baseball game? (Step 503A)
If less than two days, then blend data from NGM MOS & METAR (Step 503B)
If between two days and three days, use the data from AVN MOS & MFR MOS (Step 503C).
If between three days and seven days, use MFR MOS data (Step 503D).
If more than seven days, use climatology data (Step 503E).

In addition to the selection of the type of data, the Activity Database 413 defines that if the Event Forecast Process 401 is forecasting for a baseball game that is scheduled to occur in less than two days, then provide a time specific forecast for the first inning (defined as a point in time with respect to the scheduled beginning of the event) and another time specific forecast for the nominal end of the event (ninth inning—estimated to be three hours after the scheduled beginning of the event). The Activity Database 413 also identifies to the Event Forecast Process 401 that the variables that are important to a typical individual attending the selected event are: temperature, wind speed and direction, relative humidity, cloudiness, chance of precipitation, and heat index or wind chill. The Activity Database 413 also defines the format of the data to be presented to the user, such as wind direction should be characterized in terms of its orientation with the facility in which the event takes place. Thus, instead of an absolute measure of North at 5 mph, the present best-in-time forecasting system 100 presents the data in relative terms such as "out of left field at 5 mph". The orientation of the facility is also stored in the Activity Database 413.

In the present example, the two data sources that are selected are the most appropriate given the above criteria. Other data sources that only give a high and low for the day, such as the NWS MRF model, or the AN model do not contain enough information to forecast for a specific hour of the day. There are other sources, which can contribute to a more accurate forecast, and the inclusion of specific sources in the present best-in-time forecasting system represents a matter of design choice. The data used in this example is obtained from the well known weather sources of National Weather Service Family of Services: METAR Surface Data, and NGM MOS Data.

Both data sets are assimilated into a form that can be readily placed into the Data Store 302 contained in the Weather Information Server 102. New METAR data does not always completely outdate previously received METAR data and the newly received data must therefore be merged with the previously received data. NGM MOS data is similar in that the newly received data does not always completely outdate previously received NGM MOS data. The newly received data form both of these sources are assimilated into a single record in the Data Store 302. The system also interpolates the NGM MOS data from 3 hour intervals, as received, into 1 hour intervals. This data receipt, assimilation and interpolation occur on a continuous basis as data is available to ensure that the data stored in the Data Store 302 is always current.

The Event Forecaster Process 401 determines that the request for the forecast is less than 48 hours from the time of the event. Based upon this information, the Event Forecaster Process 401 at step 503B requests the latest METAR data for the Boston site. The Event Forecast Process 401 blends the two sets of data by comparing the actual observation data in the Boston METAR report with the forecasted information for Boston as noted in the NGNB MOS report. The Event Forecaster Process 401 calculates a difference between each variable in the two reports for which a forecast is requested and calculates a correction factor (CF) based upon the amount of time between the time of the last METAR report and the time for which the Event Forecast Process 401 is forecasting, which is termed time "T". The Event Forecaster Process 401 applies the full correction CF=1 if T=3, otherwise, $CF=e^{-a(T-3)}$, where a is a constant that determines the rate at which the amount of correction decreases over time. The Event Forecaster Process 401 then adds the calculated correction to the NGM MOS forecast values for the time that the Event Forecast Process 401 is forecasting for.

For the present example:
1. The present METAR data indicates that the Boston temperature at 7 PM is 67 degrees.
2. The NGM MOS forecast indicates that the temperature for Boston at 7 PM was 74 degrees.
3. The temperature difference is −7 degrees ($T_{diff}=-7$).
4. From the NGM MOS forecast indicates that the forecasted temperature for 10 AM tomorrow is 77 degrees ($T_{ngm}$).
5. The difference between the last known time 7 PM and the time at which we are forecasting is 15 hours.
6. The following formula, where a=0.77016353 is used to compute the correction factor $CF=e^{-a(15-3)}=0.397$.
7. The amount of correction is then given by $T_{corr}=CF*T_{diff}=-2.78$.
8. The new temperature forecast $T_{new}=T_{ngm}+T_{corr}=74$.

A temperature forecast of 74 degrees is then provided at step 506 to the requesting user for a temperature forecast for Boston valid at 10 AM tomorrow. The process assimilates information from different sources about a single location to provide a more accurate forecast than any one by themselves could provide. The event based forecast process is capable of making decisions based upon the data sources that are available and provide some information for any location it knows about for any date and time in the future.

Similar calculations are performed for the wind, precipitation probability for the beginning of the game, then the process is repeated for the time representative of the end of the game. The user ID is also used to retrieved data from the User Preferences Database 412 that identifies the format of the content that is returned to the user. For example, the requesting user can be connected over a high bandwidth communication connection and the Event Forecast Process 401 can then present the information to the user in a graphically intensive display. Similarly, the user can desire only a subset of the normally presented information, and this "filter factor" can be recorded in the User Preferences Database 412 as a result of prior user activity.

Summary

The present best-in-time forecasting system overcomes the problems of the prior art and provides a forecasting system that can customize its output forecast to the specific needs of a user and an identified event, which forecast is optimized as a function of the length of time between the receipt of the request and the time of the event. In operation, a user provides the best-in-time forecasting system with data indicative of the time, date, place for the forecast as well as the type of activity that the user wishes to participate in on the identified time and date. Regardless of the information provided by the user, the best-in-time forecasting system generates a response, with the thoroughness and accuracy of the response being a function of the specificity of the user-provided information and the length of time between the present time and the event occurrence. The user's request stimulates the best-in-time forecasting system to identify the set of resources that are available to the best-in-time forecasting system that can be used to provide the user-requested information.

The data sources are not comprehensive, but simply illustrative of the Operation of the present best-in-time forecasting system in the selected example. While the example presented is simple in nature and the data inputs and data outputs are relatively fixed, the present best-in-time forecasting system can operate in a more dynamic manner by the inclusion of a neuromorphic processing element, such as an expert system, neural network, fuzzy logic, artificial intelligence, decision trees and the like, to review the sources of data, nature of the request and then cast an appropriate response based upon past experiences and analogous requests, without the structure of the present example being the determining factor.

We claim:

1. An information management system for producing a weather related information display in response to a user specific request for weather information relating to a future event comprising:

means, connected to a plurality of information sources, each of which produces at least one weather information element of predetermined content and form and at least one of which comprises a substantially real time weather information source, for compiling time varying weather phenomena characteristic data, said at least one information element varying in form and content among said plurality of information sources;

means for enabling a user to input information which specifies a user specific request for weather information relating to a future event, said information request identifying a time and location of said future event;

means for interpreting said user specific request to identify a set of weather information relevant to said future event;

means for identifying said user specific request to identify at least one of said plurality of information sources in which weather information, that is required to respond to said user specific request, resides;

means, responsive to said interpreting means, for excerpting weather information from said at least one information source to service said user specific request; and means for dynamically compiling said excerpted weather information, including weather information from said substantially real time weather information source to produce a weather forecast of future weather conditions relating to said future event in response to said user specified request.

2. The apparatus of claim 1 further comprising:

means for delivering said produced user specified information display to a display device associated with said requesting user.

3. The apparatus of claim 2 wherein said delivering means comprises a switched communication medium which serves a plurality of subscribers.

4. The apparatus of claim wherein said plurality of information sources comprises at least one meteorological phenomena monitoring system which produces data indicative of characteristics of at least one meteorological phenomena monitored by said at least one meteorological phenomena monitoring system.

5. The system of claim 1 wherein said means for interpreting comprises:

means for identifying a correspondence between an event identified in said user specific information request and a set of said plurality of information sources that contain data relevant to said user specified information display.

6. The system of claim 5 wherein said means for interpreting further comprises:

means for identifying a correspondence between said event and selected data contained in said set of said plurality of information sources.

7. The system of claim 5 wherein said means for interpreting further comprises:

means for identifying a correspondence between said event and selected data contained in said set of said plurality of information sources, where said correspondence is a function of the time difference between receipt of said user specific information request and a time of occurrence of said event.

8. The system of claim 1 wherein said means for compiling comprises:

means for identifying a set of presentation preferences of said user which define a mode and content of said response.

9. A method of operating an information management system for producing a weather related information display in response to a user specific request for weather information relating to a future event comprising the steps of:

compiling time varying weather phenomena characteristic data from a plurality of information sources, each of which produces at least one weather information element of predetermined content and form, said at least one information element varying in form and content among said plurality of information sources and at least one of which comprises a substantially real time weather information source;

enabling a user to input information which specifies a user specific request for weather information relating to a future event, said information request identifying a time and location of said future event;

interpreting said user specific request to identify a set of weather information relevant to said future event;

identifying said user specific request to identify at least one of said plurality of information sources in which weather information, that is required to respond to said user specific request, resides;

excerpting, in response to said interpreting means, weather information from said at least one information source to service said user specific request;

dynamically compiling said excerpted weather information, including weather information from said substantially real time weather information source, to produce a weather forecast of future weather conditions relating to said future event in response to said user specified request.

10. The method of claim 9 further comprising the step of:

delivering said produced user specified information display to a display device associated with said requesting user.

11. The method of claim 10 wherein said step of enabling comprises activating a bidirectional communication interface comprising:

providing a subscriber with apparatus for inputting data which defines said user specified information display; and producing a human sensible display of said user specified information display received from said delivery means.

12. The method of claim 9 wherein said plurality of information sources comprises at least one meteorological phenomena monitoring system which produces data indicative of characteristics of at least one meteorological phenomena monitored by said at least one meteorological phenomena monitoring system, said step of compiling said excerpted information comprises:

generating a weather forecast specific to a user defined locus, time and activity.

13. The method of claim 9 wherein said step of interpreting comprises:

identifying a correspondence between an event identified in said user specific information request and a set of said plurality of information sources that contain data relevant to said user specified information display.

14. The method of claim 13 wherein said step of interpreting further comprises:

identifying a correspondence between said event and selected data contained in said set of said plurality of information sources.

15. The method of claim 13 wherein said step of interpreting further comprises:

identifying a correspondence between said event and selected data contained in said set of said plurality of information sources, where said correspondence is a function of the time difference between receipt of said user specific information request and a time of occurrence of said event.

16. The method of claim 9 wherein said step of compiling comprises:

identifying a set of presentation preferences of said user which define a mode and content of said response.

\* \* \* \* \*